United States Patent
Misra et al.

(10) Patent No.: US 11,210,471 B2
(45) Date of Patent: Dec. 28, 2021

(54) MACHINE LEARNING BASED QUANTIFICATION OF PERFORMANCE IMPACT OF DATA VERACITY

(71) Applicant: ACCENTURE GLOBAL SOLUTIONS LIMITED, Dublin (IE)

(72) Inventors: Janardan Misra, Bangalore (IN); Sanjay Podder, Thane (IN); Narendranath Sukhavasi, Nizamabad (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 336 days.

(21) Appl. No.: 16/526,471

(22) Filed: Jul. 30, 2019

(65) Prior Publication Data

US 2021/0034706 A1 Feb. 4, 2021

(51) Int. Cl.

| | |
|---|---|
| *G06F 40/20* | (2020.01) |
| *G06F 40/30* | (2020.01) |
| *G06N 20/00* | (2019.01) |
| *G06N 5/04* | (2006.01) |
| *G06F 40/205* | (2020.01) |
| *G06F 40/268* | (2020.01) |
| *G06F 40/284* | (2020.01) |

(52) U.S. Cl.
CPC ............ *G06F 40/30* (2020.01); *G06F 40/205* (2020.01); *G06F 40/268* (2020.01); *G06F 40/284* (2020.01); *G06N 5/047* (2013.01); *G06N 20/00* (2019.01)

(58) Field of Classification Search
CPC ...... G06F 40/30; G06F 40/205; G06F 40/253; G06F 40/284; G06F 16/3329; G06F 40/20; G06F 40/268; G06F 40/49
See application file for complete search history.

(56) References Cited

U.S. PATENT DOCUMENTS

| | | | |
|---|---|---|---|
| 9,214,437 B1 * | 12/2015 | Hsu | H01L 21/486 |
| 10,621,019 B1 * | 4/2020 | Faulhaber, Jr. | G06F 9/485 |
| 10,929,383 B2 * | 2/2021 | Rosu | G06F 16/2365 |
| 2012/0130771 A1 * | 5/2012 | Kannan | G06Q 10/06393 |
| | | | 705/7.32 |

(Continued)

*Primary Examiner* — Olujimi A Adesanya
(74) *Attorney, Agent, or Firm* — Mannava & Kang, P.C.

(57) ABSTRACT

In some examples, machine learning based quantification of performance impact of data irregularities may include generating an irregularity feature vector for each text analytics application of a plurality of text analytics applications. Normalized data associated with a corresponding text analytics application may be generated for each text analytics application and based on minimization of irregularities present in un-normalized data associated with the corresponding text analytics application. An un-normalized data machine learning model may be generated for each text analytics application and based on the un-normalized data associated with the corresponding text analytics application. A normalized data machine learning model may be generated for each text analytics application and based on the normalized data associated with the corresponding text analytics application. A difference in performances may be determined with respect to the un-normalized data machine learning model and the normalized data machine learning model.

20 Claims, 10 Drawing Sheets

(56) References Cited

U.S. PATENT DOCUMENTS

| | | | | |
|---|---|---|---|---|
| 2012/0254333 | A1* | 10/2012 | Chandramouli | G06N 5/04 709/206 |
| 2015/0242493 | A1* | 8/2015 | Misra | G06F 16/3325 707/727 |
| 2017/0124459 | A1* | 5/2017 | Jayaraman | G06F 16/22 |
| 2017/0222960 | A1* | 8/2017 | Agarwal | G06Q 10/107 |
| 2018/0189299 | A1* | 7/2018 | Jaggars | G06F 16/13 |
| 2018/0225280 | A1* | 8/2018 | Dugan | G06N 20/00 |
| 2019/0147371 | A1* | 5/2019 | Deo | G06N 20/00 706/12 |
| 2019/0377984 | A1* | 12/2019 | Ghanta | G06F 17/18 |
| 2020/0019884 | A1* | 1/2020 | McCourt, Jr. | G06N 20/00 |
| 2020/0286002 | A1* | 9/2020 | Szanto | G06F 40/30 |
| 2020/0344185 | A1* | 10/2020 | Singaraju | G06F 16/9024 |
| 2021/0191987 | A1* | 6/2021 | Misra | G06F 16/90332 |

\* cited by examiner

| TA Applications | Text Data | Irregularity Measure 1 | ... | Irregularity Measure k |
|---|---|---|---|---|
| App 1 | Text-Data 1 | $\alpha_{11}$ % | ... | $\alpha_{1k}$ % |
| ... | ... | ... | ... | ... |
| App N | Text-Data N | $\alpha_{N1}$ % | ... | $\alpha_{Nk}$ % |

FIG. 3

| TA Applications | Data | Fuzzy Matches | ... | Semantic Impreciseness | ML Model | Performance Measure | Impact |
|---|---|---|---|---|---|---|---|
| ED in SRS | SRS Collections | 0.07 | ... | 0.11 | *CRF* | *F1 – measure* | 0.13 |
| ED in News | News Collection | 0.13 | ... | 0.29 | *Glove* | *F1 – measure* | 0.21 |
| ED in Medical Prescriptions | Medical Records | 0.21 | ... | 0.01 | *CNN* | *F1 – measure* | 0.07 |

GENERATE, BY AT LEAST ONE HARDWARE PROCESSOR, A KNOWLEDGE BASE INCLUDING A PLURALITY OF TEXT ANALYTICS APPLICATIONS
702

GENERATE, BY THE AT LEAST ONE HARDWARE PROCESSOR AND FOR EACH TEXT ANALYTICS APPLICATION OF THE PLURALITY OF TEXT ANALYTICS APPLICATIONS, AN IRREGULARITY FEATURE VECTOR
704

GENERATE, BY THE AT LEAST ONE HARDWARE PROCESSOR, FOR EACH TEXT ANALYTICS APPLICATION AND BASED ON MINIMIZATION OF IRREGULARITIES PRESENT IN UN-NORMALIZED DATA ASSOCIATED WITH A CORRESPONDING TEXT ANALYTICS APPLICATION, NORMALIZED DATA ASSOCIATED WITH THE CORRESPONDING TEXT ANALYTICS APPLICATION
706

GENERATE, BY THE AT LEAST ONE HARDWARE PROCESSOR, FOR EACH TEXT ANALYTICS APPLICATION AND BASED ON THE UN-NORMALIZED DATA ASSOCIATED WITH THE CORRESPONDING TEXT ANALYTICS APPLICATION, AN UN-NORMALIZED DATA MACHINE LEARNING MODEL
708

GENERATE, BY THE AT LEAST ONE HARDWARE PROCESSOR, FOR EACH TEXT ANALYTICS APPLICATION AND BASED ON THE NORMALIZED DATA ASSOCIATED WITH THE CORRESPONDING TEXT ANALYTICS APPLICATION, A NORMALIZED DATA MACHINE LEARNING MODEL
710

DETERMINE, BY THE AT LEAST ONE HARDWARE PROCESSOR, A DIFFERENCE IN PERFORMANCES WITH RESPECT TO THE UN-NORMALIZED DATA MACHINE LEARNING MODEL AND THE NORMALIZED DATA MACHINE LEARNING MODEL
712

DETERMINE, BY THE AT LEAST ONE HARDWARE PROCESSOR, SEMANTIC SIMILARITY FOR EACH PAIR OF TEXT ANALYTICS APPLICATIONS OF THE PLURALITY OF TEXT ANALYTICS APPLICATIONS
714

GENERATE, BY THE AT LEAST ONE HARDWARE PROCESSOR AND BASED ON THE DETERMINED SEMANTIC SIMILARITY, A PLURALITY OF CLUSTERS FOR THE PLURALITY OF TEXT ANALYTICS APPLICATIONS
716

GENERATE, BY THE AT LEAST ONE HARDWARE PROCESSOR, FOR EACH CLUSTER OF THE PLURALITY OF CLUSTERS AND BASED ON THE IRREGULARITY FEATURE VECTORS AND THE DETERMINED DIFFERENCE IN PERFORMANCES, A REGRESSION MODEL
718

*FIG. 7 (CONT.)*

MACHINE LEARNING BASED QUANTIFICATION OF PERFORMANCE IMPACT OF DATA VERACITY

BACKGROUND

A variety of approaches may be used to design an application. An example of an application may include a text analytics application. A text analytics application may utilize input text that is used to design the application. The input text may also be used during usage of the text analytics application.

BRIEF DESCRIPTION OF DRAWINGS

Features of the present disclosure are illustrated by way of example and not limited in the following figure(s), in which like numerals indicate like elements, in which:

FIG. 3 illustrates irregularity feature matrix generation to illustrate operation of the machine learning based quantification of performance impact of data irregularities apparatus of FIG. 1 in accordance with an example of the present disclosure;

FIG. 5 illustrates an example of an extended irregularity feature matrix to illustrate operation of the machine learning based quantification of performance impact of data irregularities apparatus of FIG. 1 in accordance with an example of the present disclosure;

FIG. 7 illustrates a flowchart of an example method for machine learning based quantification of performance impact of data irregularities in accordance with an example of the present disclosure.

DETAILED DESCRIPTION

Figure 1:
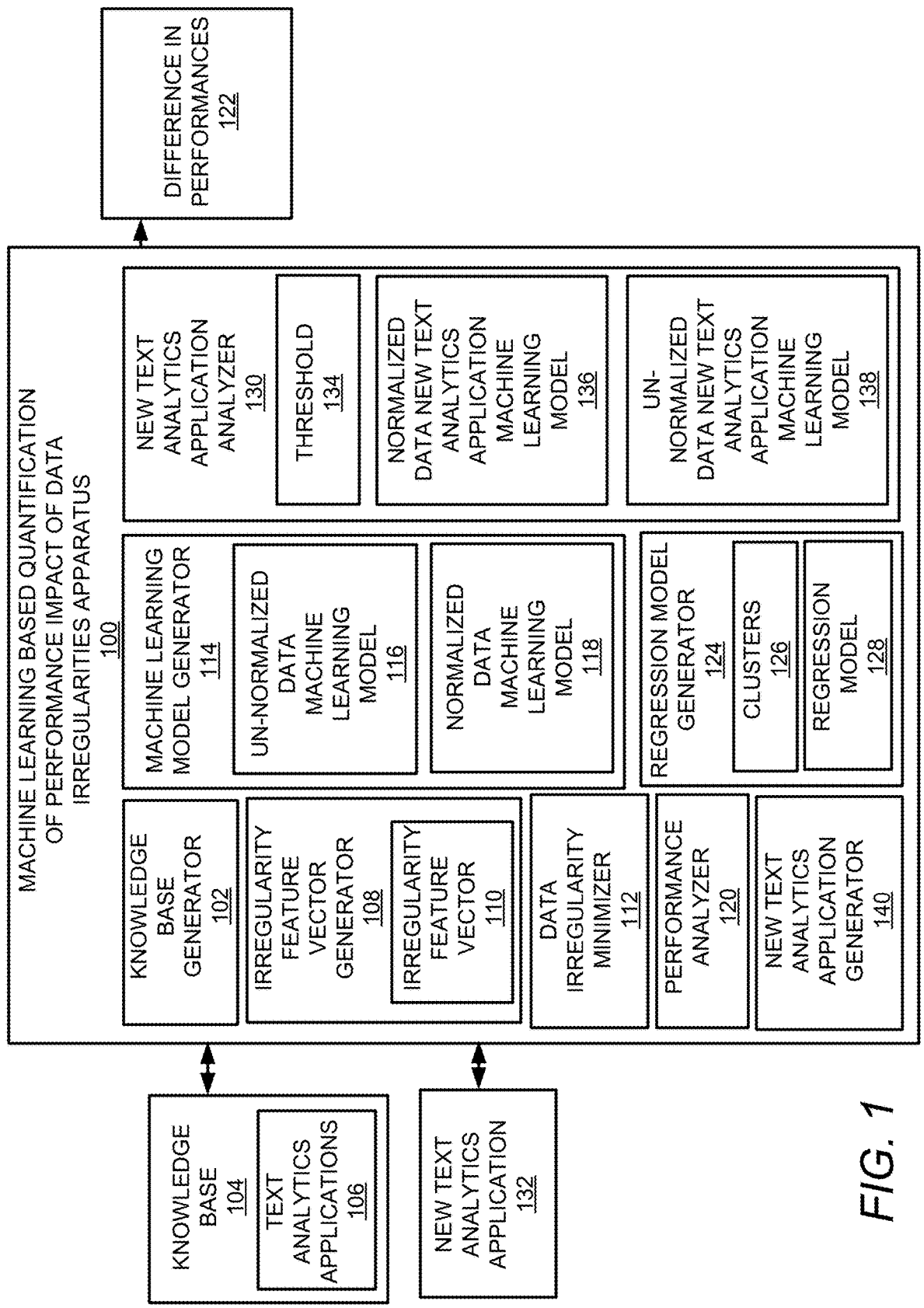
FIG. 1 illustrates a layout of a machine learning based quantification of performance impact of data irregularities apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Machine learning based quantification of performance impact of data irregularities apparatuses, methods for machine learning based quantification of performance impact of data irregularities, and non-transitory computer readable media having stored thereon machine readable instructions to provide machine learning based quantification of performance impact of data irregularities are disclosed herein. The apparatuses, methods, and non-transitory computer readable media disclosed herein provide for machine learning based quantification of performance impact of data irregularities by quantifying an impact of irregularities present in input text that may be used to design a text analytics application, and input text that may be used during usage of the text analytics application. Examples of text analytics applications may include e-mail summarization applications, user-feedback summarization applications, etc.

With respect to applications such as text analytics applications, such applications may utilize techniques such as natural language processing and machine learning to extract meaningful information from input text. The effectiveness of solutions built upon these techniques may depend on various types of features that are extracted from the input text, such as lexical features, morphological features, semantic features, and statistical features. Accuracy of an analysis performed by a text analytics application may depend on quality of the input text. For example, irregularities in the input text may negatively impact performance of a text analytics application. In this regard, it is technically challenging to quantify the impact of irregularities present in input text that may be used to design a text analytics application. It is also technically challenging to quantify the impact of irregularities present in input text that may be used during usage of the text analytics application.

In order to address at least the aforementioned technical challenges, the apparatuses, methods, and non-transitory computer readable media disclosed herein provide for machine learning based quantification of performance impact of data irregularities by quantifying the impact of irregularities present in input text that may be used to design a text analytics application, and input text that may be used during usage of the text analytics application.

According to examples disclosed herein, the apparatuses, methods, and non-transitory computer readable media disclosed herein may be implemented to design applications, such as text analytics applications. In this regard, the apparatuses, methods, and non-transitory computer readable media disclosed herein may be implemented to design applications for which data irregularities are minimized to increase performance of such applications.

The apparatuses, methods, and non-transitory computer readable media disclosed herein provide technical benefits such as quantification and minimization of irregularities in data that may be used to generate an application, and/or data that may be used during operation of an application. Further, the apparatuses, methods, and non-transitory computer readable media disclosed herein provide technical benefits such as faster operation of text analytics applications that may be generated using data for which irregularities are minimized, depending on whether expected performance loss for a new text analytics application is less than or equal to a specified threshold as disclosed herein. In this regard, based on a determination that expected performance loss for the new text analytics application is less than or equal to the specified threshold, as disclosed herein, a machine learning model for the new text analytics application may be generated from un-normalized data of the new text analytics application, and the text analytics application may be generated using this machine learning model. Alternatively, based on a determination that the expected performance loss for the new text analytics application is greater than the specified threshold, the un-normalized data of the new text analytics application may be normalized. Further, a normalized data new text analytics application machine learning model may be generated, and the text analytics application may be generated using this machine learning model.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example machine learning based quantification of performance impact of data irregularities apparatus (hereinafter also referred to as "apparatus 100").

Referring to FIG. 1, the apparatus 100 may include a knowledge base generator 102 that is executed by at least one hardware processor (e.g., the hardware processor 602 of FIG. 6, and/or the hardware processor 804 of FIG. 8) to generate a knowledge base 104 including a plurality of text analytics applications 106.

An irregularity feature vector generator 108 that is executed by at least one hardware processor (e.g., the hardware processor 602 of FIG. 6, and/or the hardware processor 804 of FIG. 8) may generate, for each text analytics application of the plurality of text analytics applications 106, an irregularity feature vector 110. In this regard, the irregularity feature vector generator 108 may analyze, for each text analytics application of the plurality of text analytics applications 106, lexical irregularities, morphological errors, parsing irregularities, semantic irregularities, and/or statistical irregularities.

A data irregularity minimizer 112 that is executed by at least one hardware processor (e.g., the hardware processor 602 of FIG. 6, and/or the hardware processor 804 of FIG. 8) may generate, for each text analytics application and based on minimization of irregularities present in un-normalized data associated with a corresponding text analytics application, normalized data associated with the corresponding text analytics application. In order to generate the normalized data, lexical irregularities may be minimized by matching each erroneous term with a closest term in a language lexicon. The matching process may involve an approximate strong matching technique such as Levenshtein distance. Further, morphological errors may be minimized by converting morphological variants of the terms to their root forms using techniques for stemming and lemmatization. This may involve usage of the language knowledge bases such as glossaries. Parsing irregularities may be minimized by changing the structure of an erroneous sentence to correct the structure as per the grammar rule which was violated by it. This may involve usage of language modelling techniques such as n-grams to estimate which change in the sentence structure is likely to result in a correct sentence. Semantic irregularities may be minimized by replacing ambiguous terms with a most probable choice, for example, by selecting one of the synonymous terms or replacing anaphoric references with the referenced terms. This may involve referring to the source of the text-data (e.g., the process which generated original text data). Lastly, statistical irregularities may be minimized by balancing all of the classes. This may involve usage of techniques such as under sampling or over sampling.

A machine learning model generator 114 that is executed by at least one hardware processor (e.g., the hardware processor 602 of FIG. 6, and/or the hardware processor 804 of FIG. 8) may generate, for each text analytics application and based on the un-normalized data associated with the corresponding text analytics application, an un-normalized data machine learning model 116. Further, the machine learning model generator 114 may generate, for each text analytics application and based on the normalized data associated with the corresponding text analytics application, a normalized data machine learning model 118.

A performance analyzer 120 that is executed by at least one hardware processor (e.g., the hardware processor 602 of FIG. 6, and/or the hardware processor 804 of FIG. 8) may determine a difference in performances 122 with respect to the un-normalized data machine learning model 116 and the normalized data machine learning model 118. In this regard, the difference in performances 122 may represent a difference in performances of two text analytics applications of the knowledge base 104. Similarly, for a new text analytics application as disclosed herein, the difference in performances 122 may represent a difference in performances of the new text analytics application that is to be built from un-normalized data versus normalized data. Thus, the difference in performances 122 may be used to analyze a new text analytics application that is to be built, without the need to actually build such an application. Further, the difference in performances 122 may be utilized as a dependent variable for the regression model as disclosed herein.

A regression model generator 124 that is executed by at least one hardware processor (e.g., the hardware processor 602 of FIG. 6, and/or the hardware processor 804 of FIG. 8) may determine semantic similarity for each pair of text analytics applications of the plurality of text analytics applications 106. The regression model generator 124 may generate, based on the determined semantic similarity, a plurality of clusters 126 for the plurality of text analytics applications 106. Further, the regression model generator 124 may generate, for each cluster of the plurality of clusters 126 and based on the irregularity feature vectors and the determined difference in performances, a regression model 128.

According to examples disclosed herein, the plurality of clusters 126 may include a problem level cluster, a problem and machine learning model level cluster, and a problem, machine learning model, and performance metric level cluster.

A new text analytics application analyzer 130 that is executed by at least one hardware processor (e.g., the hardware processor 602 of FIG. 6, and/or the hardware processor 804 of FIG. 8) may determine, for a new text analytics application 132 (e.g., a new text analytics application that is to be built), semantic similarity with each cluster of the plurality of clusters 126. The new text analytics application analyzer 130 may identify, based on the determined semantic similarity with each cluster of the plurality of clusters 126, a cluster with a maximum semantic similarity.

The irregularity feature vector generator 108 may generate, for the new text analytics application, the irregularity feature vector.

According to examples disclosed herein, the new text analytics application analyzer 130 may apply, for the identified cluster with the maximum semantic similarity, an associated regression model on the irregularity feature vector for the new text analytics application. Further, the new text analytics application analyzer 130 may determine, based on the application of the associated regression model on the irregularity feature vector for the new text analytics application, an expected performance loss if irregularities in text data of the new text analytics application are not minimized.

According to examples disclosed herein, the new text analytics application analyzer 130 may determine whether the expected performance loss for the new text analytics application is less than or equal to a specified threshold 134. Based on a determination that the expected performance loss for the new text analytics application is less than or equal to the specified threshold 134, the new text analytics application analyzer 130 may generate a machine learning model for the new text analytics application from un-normalized data of the new text analytics application.

Based on a determination that the expected performance loss for the new text analytics application is less than or equal to the specified threshold 134, a new text analytics application generator 140 that is executed by at least one hardware processor (e.g., the hardware processor 602 of FIG. 6, and/or the hardware processor 804 of FIG. 8) may generate, based on the machine learning model generated from the un-normalized data of the new text analytics application (e.g., the un-normalized data new text analytics application machine learning model as disclosed herein), the new text analytics application 132.

According to examples disclosed herein, based on a determination that the expected performance loss for the new text analytics application is greater than the specified threshold 134, the new text analytics application analyzer 130 may normalize the un-normalized data of the new text analytics application.

According to examples disclosed herein, the new text analytics application analyzer 130 may generate, for the new text analytics application and based on the normalized data of the new text analytics application, a normalized data new text analytics application machine learning model 136. The new text analytics application analyzer 130 may determine the difference in performances 122 with respect to an un-normalized data new text analytics application machine learning model 138 and the normalized data new text analytics application machine learning model 136.

Based on a determination that the expected performance loss for the new text analytics application is greater than the specified threshold 134, the new text analytics application generator 140 may generate, based on the normalized data new text analytics application machine learning model 136, the new text analytics application 132.

Operation of the apparatus 100 is described in further detail with reference to FIGS. 1-5.

Figure 2:
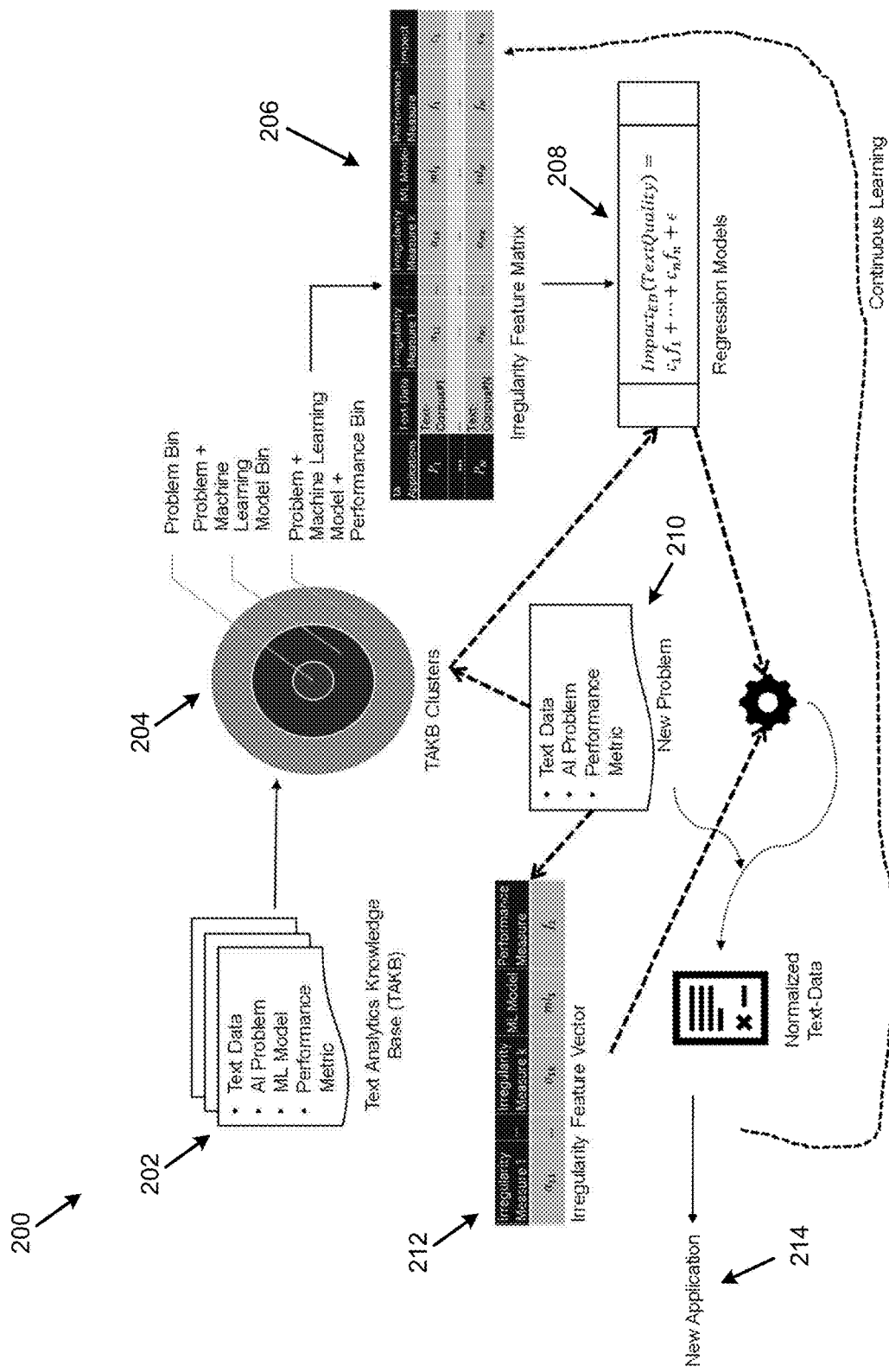
FIG. 2 illustrates an architecture of the machine learning based quantification of performance impact of data irregularities apparatus of FIG. 1 in accordance with an example of the present disclosure.

FIG. 2 illustrates an architecture 200 of the apparatus 100 in accordance with an example of the present disclosure.

Referring to FIGS. 1 and 2, and particularly FIG. 2, at 202, the knowledge base generator 102 may generate the knowledge base 104 including the plurality of text analytics applications 106.

At 204, the machine learning model generator 114 may generate, for each text analytics application and based on the un-normalized data associated with the corresponding text analytics application, the un-normalized data machine learning model 116. In this regard, the machine learning model generator 114 may generate the un-normalized data machine learning model 116 for each text analytics application, and determine performance metrics (or collect details if available) using, for example, n-fold cross validation, and/or test data. For example, the machine learning model generator 114 may distribute all of the applications in a corpus into different bins based upon the following criteria. A first Bin (e.g., Bin-1; Problem_Bin) may group all of the applications related to each artificial intelligence problem together. A second Bin (e.g., Bin-2; Problem_Model_Bin) may group all of the applications related to each unique pair (e.g., artificial intelligence problem, machine learning model). A third Bin (e.g., Bin-3; Problem_Model_Performance_Bin) may group all of the applications related to each unique triplet (e.g., artificial intelligence problem, machine learning model, performance).

Figure 4:
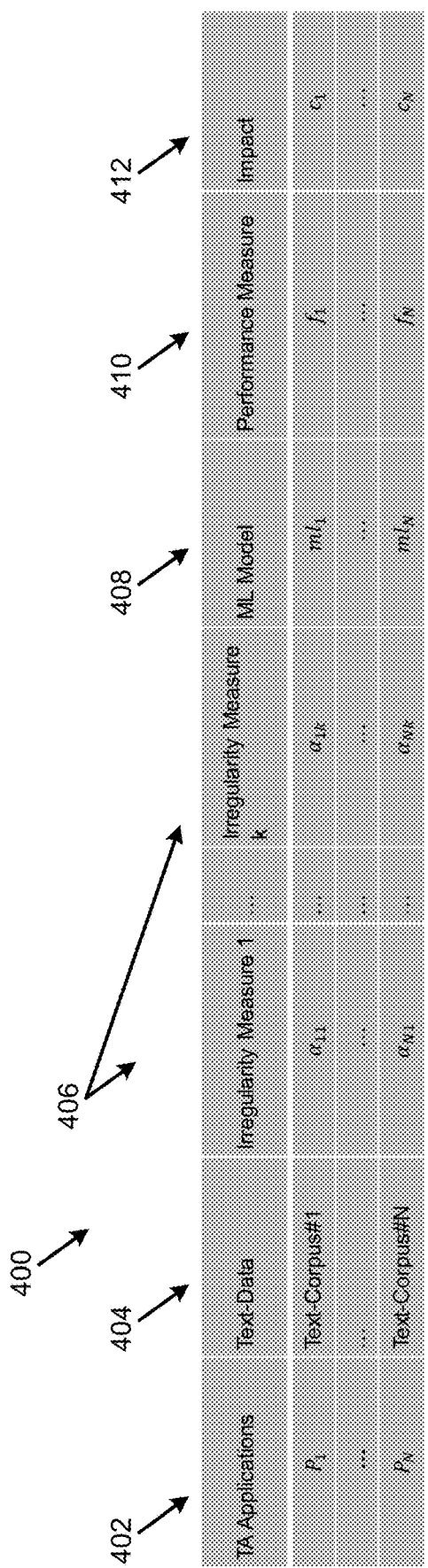
FIG. 4 illustrates extended irregularity feature matrix generation to illustrate operation of the machine learning based quantification of performance impact of data irregularities apparatus of FIG. 1 in accordance with an example of the present disclosure.

At 206, as disclosed herein in further detail with reference to FIG. 4, the performance analyzer 120 may generate an extended irregularity feature matrix that may be used to estimate a regression model as shown at 208. The regression model may be linear or non-linear.

At 210, the new text analytics application analyzer 130 may determine, for the new text analytics application 132 (e.g., a new text analytics application that is to be built), semantic similarity with each cluster of the plurality of clusters 126. The new text analytics application analyzer 130 may identify, based on the determined semantic similarity with each cluster of the plurality of clusters 126, a cluster with a maximum semantic similarity.

At 212, the irregularity feature vector generator 108 may generate, for the new text analytics application, the irregularity feature vector.

At 214, as disclosed herein, based on a determination that the expected performance loss for the new text analytics application is greater than the specified threshold 134, the new text analytics application generator 140 may generate, based on the normalized data new text analytics application machine learning model 136, the new text analytics application 132.

Referring again to FIG. 1, as disclosed herein, the knowledge base generator 102 may generate the knowledge base 104 including the plurality of text analytics applications 106. In this regard, each text analytics application may include text data, a technical problem, a machine learning model, and performance metrics. For example, the text data may be used for training and validation. The technical problem may represent a problem that needs to be solved to realize an intended function of the text analytics application. Examples of technical problems may include entity extraction, phrase mining, event mining, dependency mining, etc. The machine learning model may be trained using the text data for solving the technical problem. Examples of machine learning models may include condition random fields (CRF), hidden Markov model (HMM), support vector machine (SVM), long short-term memory (LSTM), etc. The performance metrics may be used for estimating performance of the machine learning model. Examples of performance metrics may include accuracy, precision, recall, F1 score, etc.

The irregularity feature vector generator 108 may generate, for each text analytics application of the plurality of text analytics applications 106, the irregularity feature vector 110. The irregularity may represent a measurable characteristic of the text data, which may indicate presence of elements in the text which do not positively contribute to the performance of the machine learning model being designed using the text data to solve the underlying technical problem. Classes of irregularities may include lexical irregularities, morphological errors, parsing errors (e.g., structural irregularities), semantic irregularities, and/or statistical irregularities.

In order to generate the irregularity feature vector 110, the irregularity feature vector generator 108 may first detect a language (or languages) used to express the text data. For example, for "Int A=Int B*2//Variable x of type integer is double of the variable Y", there are two languages used, one programming language being "Int A=Int B*2", and the other language being English (e.g., "Variable x of type integer is double of the variable Y").

Next, with respect to lexical irregularities, lexical rules may specify which sequence of characters should be considered a valid token of the underlying language. Examples of lexical rules may include a first rule that specifies that in the English language, a space separates successive tokens, a second rule that specifies that an email address should follow a specified Regex standard, etc. The irregularity feature vector generator 108 may identify violations of the lexical rules of the detected languages in the text data, where each violation may be considered as a lexical irregularity. Examples of lexical irregularities in the English language may include word conflations, spelling mistakes, fuzzy variants, etc. With respect to word conflations where multiple words may be joined together (e.g., space as a delimiter is omitted), an example may include "multiplewords" that is a conflation of the words "multiple" and "words". An example of a spelling mistake may include the word "multiple" being misspelled as "multeple". An example of fuzzy variants may include spelling of persons names as "Jokahon" and "Jokahun".

With respect to morphological irregularities, morphological variance of tokens may be derived by applying structural changes in using rules specified by the morphological grammar of the language. Examples of morphological variance for English may include prefixes (e.g., common → uncommon), suffixes (e.g., common → commonest), stem variants (e.g., perform → performing → performed), and lexemes (e.g., go → went → gone). The irregularity feature vector generator 108 may identify morphological variants of the tokens/words in the language(s) detected in the text data. Each morphological variant may be considered as an instance of morphological irregularity.

With respect to structural irregularities, grammar rules of a language may specify structural composition of sentences in a language including dependencies among constituents within a sentence. An example of a grammar rule may include subject, predicate, object dependency. Each violation of a grammar rule may be considered as an instance of structural irregularity. The irregularity feature vector generator 108 may identify structural irregularities in the input text data. An example of a structural irregularity may include a correct structure as "Writer A is writing a book", as opposed to an incorrect structure of "A book is writing Writer A". Another example of a structural irregularity may include a dependency violation (e.g., a sentence including only proper nouns). Another example of a structural irregularity may include an incorrect word order (e.g., a sentence starting with a verb). A further example of a structural irregularity may include embedded complex data types (e.g., a sentence with a uniform resource locator (URL) used as a verb). A yet further example of a structural irregularity may include embedded non-text details (e.g., tables, images, audio, where an example may include a sentence with part of the information as an embedded audio).

With respect to semantic irregularities, the irregularity feature vector generator 108 may identify semantic irregularities such as term ambiguities, synonym and hyponym occurrences, anaphoric ambiguities, semantic impreciseness, word sense ambiguities, etc. Term ambiguities may be measured at a fraction of the vocabulary used in a text corpus, which involves ambiguity in term usage. Synonym and hyponym occurrences may be measured as a fraction of the vocabulary used in a text corpus involving at least one synonymous or hyponymous term. Anaphoric ambiguities may be measured as a number of anaphoric references present in a text corpus as against non-anaphoric (e.g., explicit) references. Semantic impreciseness may be measured as a fraction of sentences that involve semantically imprecise phrases. Word sense ambiguities may be measured as a fraction of terms that need word sense disambiguation.

With respect to statistical irregularities, the irregularity feature vector generator 108 may identify different types of statistical irregularities present in text data. With respect to duplicate text segments, a substantial number of documents (e.g., at least 10% of all documents in a text corpus) may be syntactically similar (default being greater than 95% similar). In this regard, let X represent a text corpus including two or more documents as text data. A degree of duplicity may be determined as follows:

$$\text{Degree of Duplicity} = 1 - \frac{|\{w \in X \mid \forall\, w' \in X \cdot w' \neq w \cdot sim(w, w') < 0.95\}|}{|X|} \quad \text{Equation (1)}$$

For Equation (1), the numerator may represent measurement of the total number of unique documents in the text corpus X, where a unique document may be described as a document that is not similar to any other document in the corpus. Further, for Equation (1), w, w' may span over the set of documents in the text corpus X.

With respect to statistical irregularities, the irregularity feature vector generator 108 may determine class imbalances that indicate that a distribution of text data points over various classes is non-uniform. In this regard, assuming that all classes in a solution space include a similar number of labeled data points for their learnability, let Z represent a set of classes for which labeled text data exists in the corpus. The irregularity feature vector generator 108 may determine the following:

$$\text{Degree of class imbalance} = \frac{\theta}{|Z|} \quad \text{Equation (2)}$$

$$\theta = |\{z_i \in Z \mid |\alpha_i - \mu_Z| < \sigma\}| \quad \text{Equation (3)}$$

For Equation (3), θ may represent a number of classes $z_i$, sizes of which $\alpha_i$, are beyond one standard deviation a from the mean $\mu_z$.

The irregularity feature vector generator 108 may build an irregularity feature matrix based on the estimates of various irregularities in the text. An example of an irregularity feature matrix 300 is shown in FIG. 3. The irregularity feature matrix 300 may include text analytics applications at 302, text data associated with a corresponding application at 304, and irregularity measures at 306.

Referring again to FIG. 1, the machine learning model generator 114 may generate, for each text analytics application and based on the un-normalized data associated with the corresponding text analytics application, the un-normalized data machine learning model 116. In this regard, the machine learning model generator 114 may generate the un-normalized data machine learning model 116 for each text analytics application, and determine performance metrics (or collect details if available) using, for example, n-fold cross validation, and/or test data. For example, the machine learning model generator 114 may distribute all of the applications in a corpus into different bins based upon the following criteria. A first Bin (e.g., Bin-1; Problem_Bin) may group all of the applications related to each artificial intelligence problem together. Examples of artificial intelligence problems may include a text classification problem, an e-mail classification problem, an article classification problem, etc. A second Bin (e.g., Bin-2; Problem_Model_Bin) may group all of the applications related to each unique pair (e.g., artificial intelligence problem, machine learning model). A third Bin (e.g., Bin-3; Problem_Model_Performance_Bin) may group all of the applications related to each unique triplet (e.g., artificial intelligence problem, machine learning model, performance criterion).

In order to estimate machine learning performances on the un-normalized data, as disclosed herein, the machine learning model generator 114 may generate, for each text analytics application and based on the un-normalized data associated with the corresponding text analytics application, the un-normalized data machine learning model 116. The un-normalized data may represent raw text with irregularities. Performances of the un-normalized data machine learning models may be measured by using n-fold cross validation, by using test data, or based on collection of these details if already available (e.g., from previously built machine learning models).

As disclosed herein, the data irregularity minimizer 112 may generate, for each text analytics application and based on minimization of irregularities present in un-normalized data associated with a corresponding text analytics application, normalized data associated with the corresponding text analytics application. Further, the machine learning model generator 114 may generate, for each text analytics application and based on the normalized data associated with the corresponding text analytics application, the normalized data machine learning model 118. In this regard, performances of the normalized data machine learning models may be measured in a similar manner as disclosed herein with respect to performances of the un-normalized data machine learning models.

As disclosed herein, the performance analyzer 120 may determine a difference in performances 122 with respect to the un-normalized data machine learning model 116 and the normalized data machine learning model 118. In this regard, the performance analyzer 120 may determine a difference in performances 122 to determine the potential impact of the irregularities. Further, as shown in FIG. 4, the performance analyzer 120 may generate an extended irregularity feature matrix 400 that may be used to estimate a regression model as disclosed herein. The extended irregularity feature matrix 400 may include a listing of the text analytics applications at 402, text data at 404, irregularity measures at 406, associated machine learning models at 408, performance measures at 410, and impact values at 412.

FIG. 5 illustrates an example of an extended irregularity feature matrix 500 to illustrate operation of the apparatus 100 in accordance with an example of the present disclosure.

Referring to FIG. 5, for an artificial intelligence problem related to entity disambiguation, the extended irregularity feature matrix 500 may include a listing of the text analytics applications at 502, text data at 504, irregularity measures at 506, associated machine learning models at 508, performance measures at 510, and impact values at 512.

Referring again to FIG. 1, as disclosed herein, the regression model generator 124 may generate, for each cluster of the plurality of clusters 126 and based on the irregularity feature vectors and the determined difference in performances, the regression model 128. In this regard, the regression model generator 124 may generate a plurality of regression models using the aforementioned irregularity feature vectors of each text analytics application, and the aforementioned performance differentiation estimated at different binning levels.

As disclosed herein, the regression model generator 124 may determine semantic similarity for each pair of text analytics applications of the plurality of text analytics applications 106. In this regard, the regression model generator 124 may estimate semantic similarity between each pair of text analytics applications at the problem level, at the problem and machine learning model level, and at the problem, the machine learning model, and the performance metric level. In this regard, the regression model generator may reference ontological knowledge on underlying problems and/or machine learning models and/or performance metrics.

As disclosed herein, the regression model generator 124 may generate, based on the determined semantic similarity, the plurality of clusters 126 for the plurality of text analytics applications 106. In this regard, the regression model generator 124 may apply clustering to group the text analytics applications into different bins at different levels. For example, the regression model generator may cluster the text analytics applications at a problem level, at a problem and machine learning model level, and at a problem, a machine learning model, and a performance metric level.

As disclosed herein, the regression model generator 124 may generate, for each cluster of the plurality of clusters 126 and based on the irregularity feature vectors and the determined difference in performances, the regression model 128. In this regard, the regression model generator 124 may generate regression models using irregularity feature vectors and performance differentiation (e.g., the aforementioned extended irregularity feature matrix). The regression models may be generated for each cluster at the problem level, for each cluster at the problem and machine learning model level, and for each cluster at the problem, the machine learning model, and the performance metric level.

With respect to generation of the regression models for quantifying performance impact of irregularities, for each bin type, and for each group under a bin type, the regression model generator 124 may build a regression model for the performance impact of the irregularities using statistical regression techniques such as partial recursive least min square, random forest regression, regression coefficients, importance ranking, etc. The regression models may be used to estimate a degree to which different irregularities impact performance. With respect to the extended irregularity feature matrices of FIGS. 4 and 5, an example of a regression model may be specified as follows:

$$\text{Impact\_}E(\text{TextQuality,CRF},F\_1\text{-measure}) = 0.47*\text{SemanticImprecseness} - 0.09*\text{FuzzyMatches} + 0.0841 \quad \text{Equation (4)}$$

For Equation (4), referring to FIGS. 4 and 5, all other listed irregularities may be captured under " . . . " (e.g., word sense ambiguities).

As disclosed herein, the new text analytics application analyzer 130 may receive details for the new text analytics application 132. In this regard, such the details of the new text analytics application 132 may include a problem specification, text data for training and validation, a probable machine learning model, and a performance metric.

The new text analytics application analyzer 130 may determine, for the new text analytics application 132, semantic similarity with each cluster of the plurality of clusters 126. The semantic similarity may be determined by referencing ontological knowledge on underlying problems and/or machine learning models and/or performance metrics. The new text analytics application analyzer 130 may identify, based on the determined semantic similarity with each cluster of the plurality of clusters 126, a cluster with a maximum semantic similarity.

The irregularity feature vector generator 108 may generate, for the new text analytics application, the irregularity feature vector. The irregularity feature vector may account for lexical irregularities, morphological errors, parsing irregularities, semantic irregularities, and statistical irregularities.

The new text analytics application analyzer 130 may apply, for the identified cluster with the maximum semantic similarity, an associated regression model on the irregularity feature vector for the new text analytics application. In this regard, the new text analytics application analyzer 130 may apply the regression model at the problem level for the identified cluster with the maximum semantic similarity on the irregularity feature vector of the new text analytics application 132. Further, the new text analytics application analyzer 130 may determine, based on the application of the associated regression model on the irregularity feature vector for the new text analytics application 132, an expected performance loss if irregularities in text data of the new text analytics application are not minimized. The expected performance loss may be determined as difference in performance between un-normalized data versus normalized data.

As disclosed herein, the new text analytics application analyzer 130 may determine whether the expected performance loss for the new text analytics application is less than or equal to a specified threshold 134. For example, the specified threshold 134 may be 5%. Based on a determination that the expected performance loss for the new text analytics application is less than or equal to the specified threshold 134, the new text analytics application analyzer 130 may generate a machine learning model for the new text analytics application from un-normalized data of the new text analytics application 132.

Based on the determination that the expected performance loss for the new text analytics application is greater than the specified threshold 134, the new text analytics application analyzer 130 may normalize the un-normalized data of the new text analytics application. In this regard, the new text analytics application analyzer 130 may apply techniques for those irregularities that are positively correlated (e.g., as per the regression model of the cluster), with the drop in the performance impact of the proposed machine learning application. In this regard, in the regression model, there may be irregularities which have positive regression coefficients and in the irregularity feature vector the estimates for these irregularities may also be relatively higher (as compared to other irregularities). These irregularities may be considered as relatively more positively correlated with the drop in the performance as compared to other irregularities for which either regression coefficients are negative or their estimates in the text are very low (e.g., close to zero).

The new text analytics application analyzer 130 may generate, for the new text analytics application and based on the normalized data of the new text analytics application, the normalized data new text analytics application machine learning model 136. The new text analytics application analyzer 130 may determine the difference in performances 122 with respect to the un-normalized data new text analytics application machine learning model 138 and the normalized data new text analytics application machine learning model 136. In this regard, the new text analytics application analyzer 130 may also estimate performance using the un-normalized data of the new text analytics application, and estimated performance differentiation as disclosed herein.

The new text analytics application analyzer 130 may update the regression models of the clusters of the new text analytics application 132. Further, the new text analytics application analyzer 130 may add the irregularity feature vector and the performance differentiation to existing regression databases, and re-determine the regression models.

Thus, with respect to the new text analytics application 132, the new text analytics application analyzer 130 may generate a ranked list of irregularity measures. Further, the new text analytics application analyzer 130 may determine a performance impact estimate of irregularities. An outcome of the analysis performed by the new text analytics application analyzer 130 may include minimization of top ranking irregularities from the text data of the new text analytics application 132. Another outcome of the analysis performed by the new text analytics application analyzer 130 may include building of a machine learning model, and deployment of the new text analytics application 132. A further outcome of the analysis performed by the new text analytics application analyzer 130 may include update of the regression model using details from continuous learning associated with the new text analytics application 132.

Figure 6:
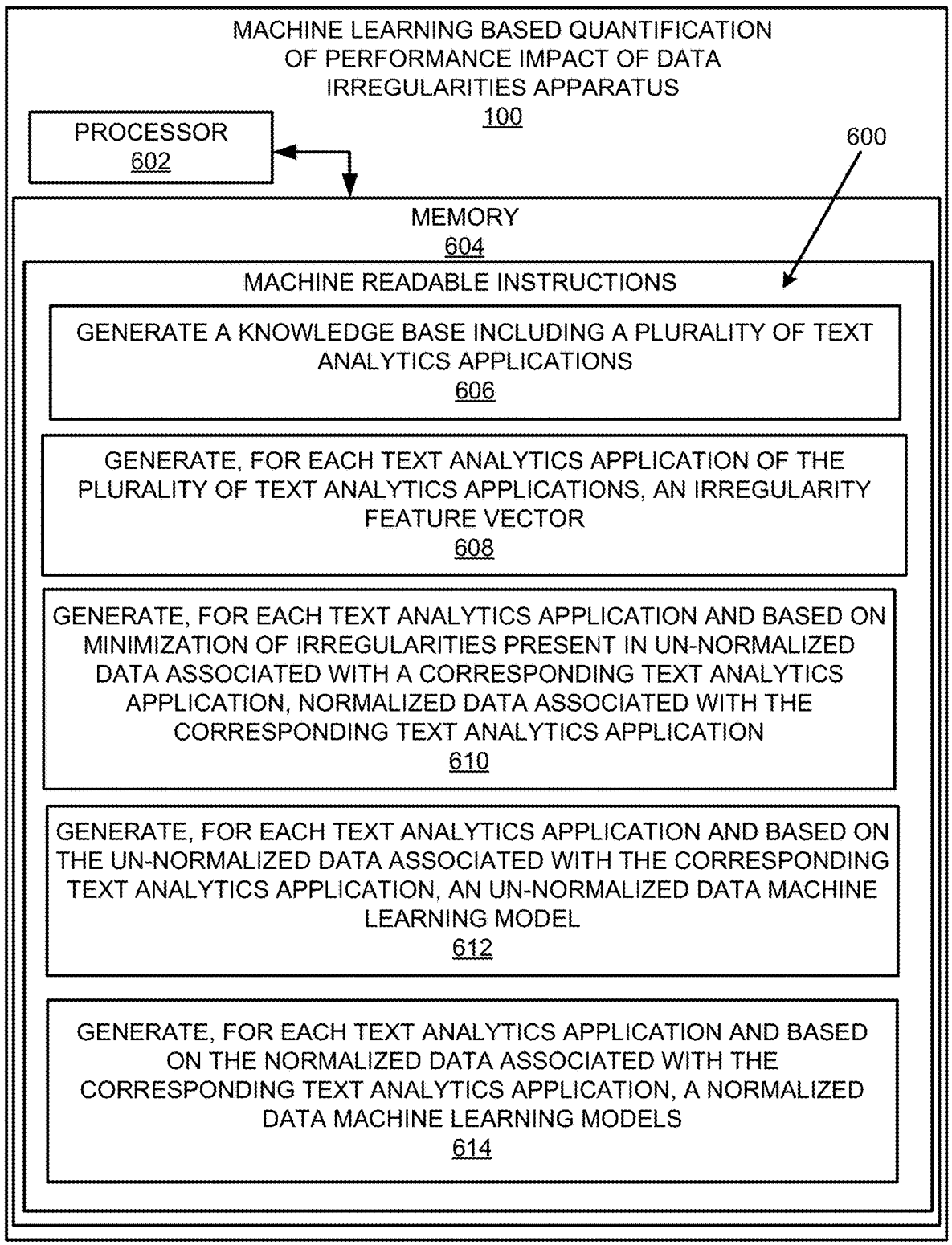
FIG. 6 illustrates an example block diagram for machine learning based quantification of performance impact of data irregularities in accordance with an example of the present disclosure.
Figure 6:
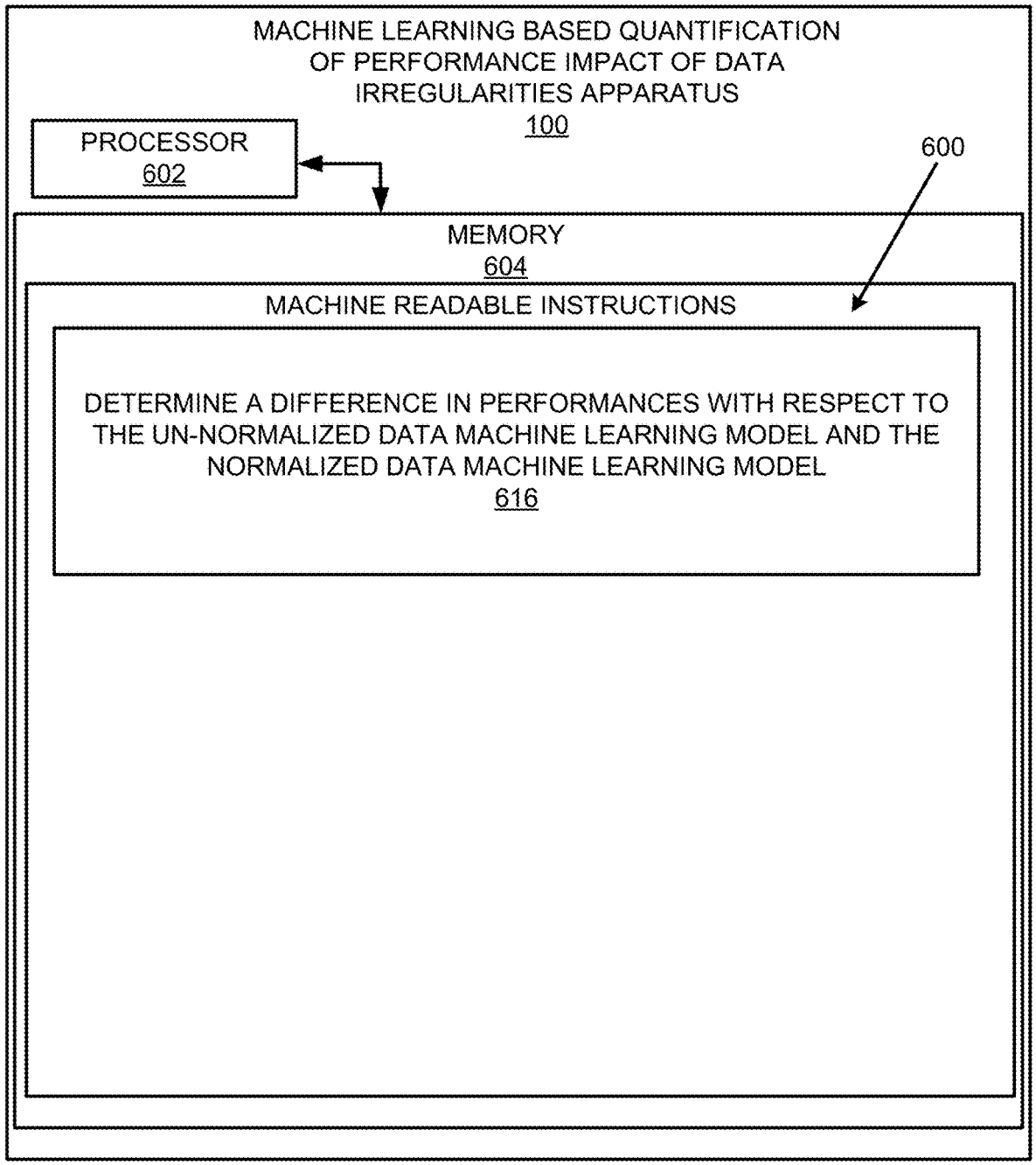
Figure 8:
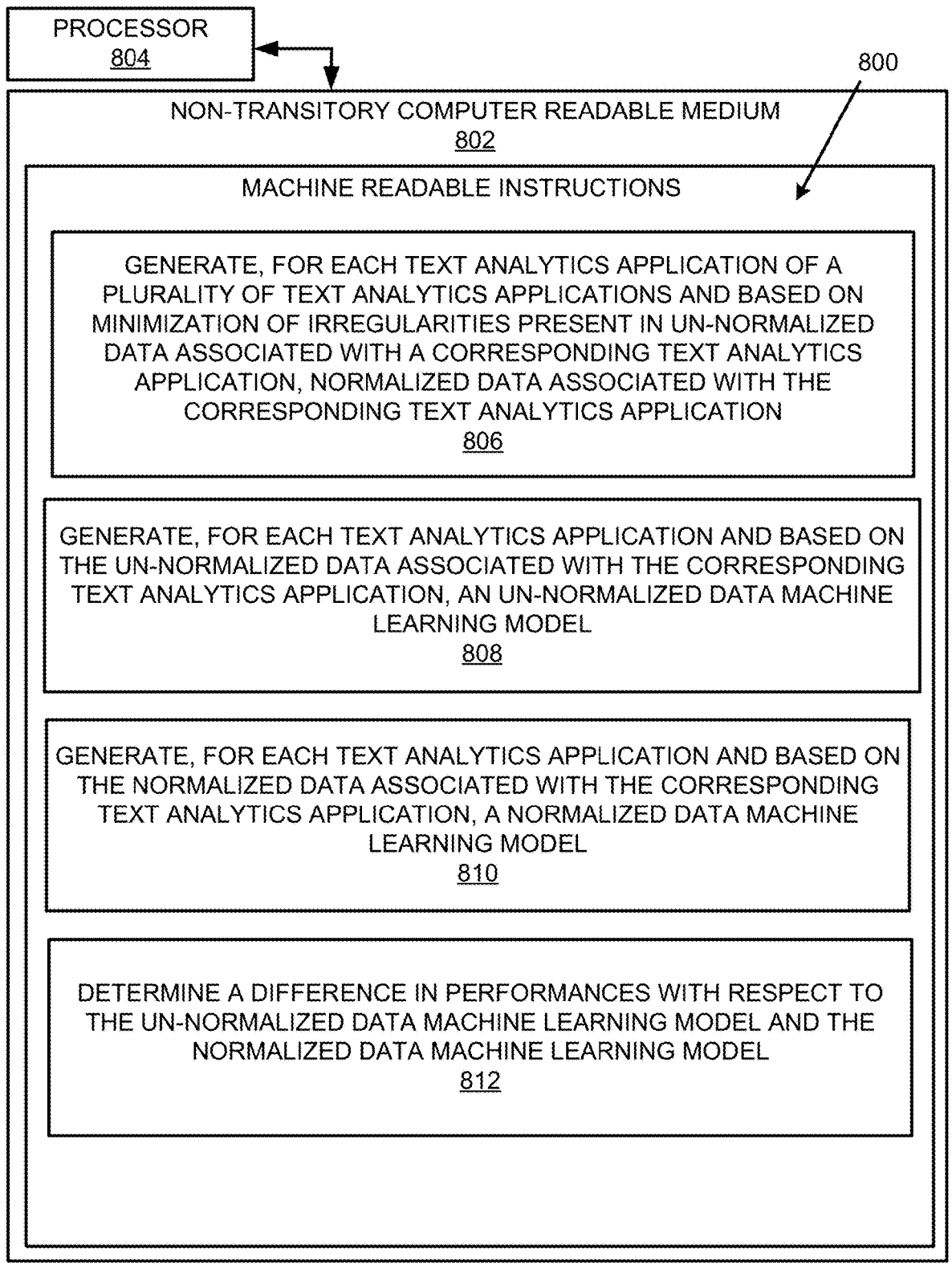
FIG. 8 illustrates a further example block diagram for machine learning based quantification of performance impact of data irregularities in accordance with another example of the present disclosure.

FIGS. 6-8 respectively illustrate an example block diagram 600, a flowchart of an example method 700, and a further example block diagram 800 for machine learning based quantification of performance impact of data irregularities, according to examples. The block diagram 600, the method 700, and the block diagram 800 may be implemented on the apparatus 100 described above with reference to FIG. 1 by way of example and not of limitation. The block diagram 600, the method 700, and the block diagram 800 may be practiced in other apparatus. In addition to showing the block diagram 600, FIG. 6 shows hardware of the apparatus 100 that may execute the instructions of the block diagram 600. The hardware may include a processor 602, and a memory 604 storing machine readable instructions that when executed by the processor cause the processor to perform the instructions of the block diagram 600. The memory 604 may represent a non-transitory computer readable medium. FIG. 7 may represent an example method for machine learning based quantification of performance impact of data irregularities, and the steps of the method. FIG. 8 may represent a non-transitory computer readable medium 802 having stored thereon machine readable instructions to provide machine learning based quantification of performance impact of data irregularities according to an example. The machine readable instructions, when executed, cause a processor 804 to perform the instructions of the block diagram 800 also shown in FIG. 8.

The processor 602 of FIG. 6 and/or the processor 804 of FIG. 8 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 802 of FIG. 8), such as hardware storage devices (e.g., RAM (random access memory), ROM (read only memory), EPROM (erasable, programmable ROM), EEPROM (electrically erasable, programmable ROM), hard drives, and flash memory). The memory 604 may include a RAM, where the machine readable instructions and data for a processor may reside during runtime.

Referring to FIGS. 1-6, and particularly to the block diagram 600 shown in FIG. 6, the memory 604 may include instructions 606 to generate a knowledge base 104 including a plurality of text analytics applications 106.

The processor 602 may fetch, decode, and execute the instructions 608 to generate, for each text analytics application of the plurality of text analytics applications 106, an irregularity feature vector 110.

The processor 602 may fetch, decode, and execute the instructions 610 to generate, for each text analytics application and based on minimization of irregularities present in un-normalized data associated with a corresponding text analytics application, normalized data associated with the corresponding text analytics application.

The processor 602 may fetch, decode, and execute the instructions 612 to generate, for each text analytics application and based on the un-normalized data associated with the corresponding text analytics application, an un-normalized data machine learning model 116.

The processor 602 may fetch, decode, and execute the instructions 614 to generate, for each text analytics application and based on the normalized data associated with the corresponding text analytics application, a normalized data machine learning model 118.

The processor 602 may fetch, decode, and execute the instructions 616 to determine a difference in performances 122 with respect to the un-normalized data machine learning model 116 and the normalized data machine learning model 118.

Referring to FIGS. 1-5 and 7, and particularly FIG. 7, for the method 700, at block 702, the method may include generating a knowledge base 104 including a plurality of text analytics applications 106.

At block 704, the method may include generating, for each text analytics application of the plurality of text analytics applications 106, an irregularity feature vector 110.

At block 706, the method may include generating, for each text analytics application and based on minimization of irregularities present in un-normalized data associated with a corresponding text analytics application, normalized data associated with the corresponding text analytics application.

At block 708, the method may include generating, for each text analytics application and based on the un-normalized data associated with the corresponding text analytics application, an un-normalized data machine learning model 116.

At block 710, the method may include generating, for each text analytics application and based on the normalized data associated with the corresponding text analytics application, a normalized data machine learning model 118.

At block 712, the method may include determining a difference in performances 122 with respect to the un-normalized data machine learning model 116 and the normalized data machine learning model 118.

At block 714, the method may include determining semantic similarity for each pair of text analytics applications of the plurality of text analytics applications 106.

At block 716, the method may include generating, based on the determined semantic similarity, a plurality of clusters 126 for the plurality of text analytics applications 106.

At block 718, the method may include generating, for each cluster of the plurality of clusters 126 and based on the irregularity feature vectors and the determined difference in performances, a regression model 128.

Referring to FIGS. 1-5 and 8, and particularly FIG. 8, for the block diagram 800, the non-transitory computer readable medium 802 may include instructions 806 to generate, for each text analytics application of a plurality of text analytics applications 106 and based on minimization of irregularities present in un-normalized data associated with a corresponding text analytics application, normalized data associated with the corresponding text analytics application.

The processor 804 may fetch, decode, and execute the instructions 808 to generate, for each text analytics application and based on the un-normalized data associated with the corresponding text analytics application, an un-normalized data machine learning model 116.

The processor 804 may fetch, decode, and execute the instructions 810 to generate, for each text analytics application and based on the normalized data associated with the corresponding text analytics application, a normalized data machine learning model 118.

The processor 804 may fetch, decode, and execute the instructions 812 to determine a difference in performances 122 with respect to the un-normalized data machine learning model 116 and the normalized data machine learning model 118.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A machine learning based quantification of performance impact of data irregularities apparatus comprising:
   a knowledge base generator, executed by at least one hardware processor, to
      generate a knowledge base including a plurality of text analytics applications;
   an irregularity feature vector generator, executed by the at least one hardware processor, to
      generate, for each text analytics application of the plurality of text analytics applications, an irregularity feature vector;
   a data irregularity minimizer, executed by the at least one hardware processor, to
      generate, for each text analytics application and based on minimization of irregularities present in un-normalized data associated with a corresponding text analytics application, normalized data associated with the corresponding text analytics application;
a machine learning model generator, executed by the at least one hardware processor, to
generate, for each text analytics application and based on the un-normalized data associated with the corresponding text analytics application, an un-normalized data machine learning model, and
generate, for each text analytics application and based on the normalized data associated with the corresponding text analytics application, a normalized data machine learning model; and
a performance analyzer, executed by the at least one hardware processor, to
determine a difference in performances with respect to the un-normalized data machine learning model and the normalized data machine learning model.

2. The apparatus according to claim 1, wherein the irregularity feature vector generator is executed by the at least one hardware processor to generate, for each text analytics application of the plurality of text analytics applications, the irregularity feature vector by:
analyzing, for each text analytics application of the plurality of text analytics applications, at least one of lexical irregularities, morphological errors, parsing irregularities, semantic irregularities, or statistical irregularities.

3. The apparatus according to claim 1, further comprising:
a regression model generator, executed by the at least one hardware processor, to:
determine semantic similarity for each pair of text analytics applications of the plurality of text analytics applications;
generate, based on the determined semantic similarity, a plurality of clusters for the plurality of text analytics applications; and
generate, for each cluster of the plurality of clusters and based on the irregularity feature vectors and the determined difference in performances, a regression model.

4. The apparatus according to claim 3, wherein the plurality of clusters include a problem level cluster, a problem and machine learning model level cluster, and a problem, machine learning model, and performance metric level cluster.

5. The apparatus according to claim 3, further comprising:
a new text analytics application analyzer, executed by the at least one hardware processor, to:
determine, for a new text analytics application, semantic similarity with each cluster of the plurality of clusters; and
identify, based on the determined semantic similarity with each cluster of the plurality of clusters, a cluster with a maximum semantic similarity,
wherein the irregularity feature vector generator is executed by the at least one hardware processor to generate, for the new text analytics application, the irregularity feature vector.

6. The apparatus according to claim 5, wherein the new text analytics application analyzer is executed by the at least one hardware processor to:
apply, for the identified cluster with the maximum semantic similarity, an associated regression model on the irregularity feature vector for the new text analytics application; and
determine, based on the application of the associated regression model on the irregularity feature vector for the new text analytics application, an expected performance loss if irregularities in text data of the new text analytics application are not minimized.

7. The apparatus according to claim 6, wherein the new text analytics application analyzer is executed by the at least one hardware processor to:
determine whether the expected performance loss for the new text analytics application is less than or equal to a specified threshold; and
based on a determination that the expected performance loss for the new text analytics application is less than or equal to the specified threshold, generate a machine learning model for the new text analytics application from un-normalized data of the new text analytics application.

8. The apparatus according to claim 7, further comprising:
a new text analytics application generator, executed by the at least one hardware processor, to:
generate, based on the machine learning model generated from the un-normalized data of the new text analytics application, the new text analytics application.

9. The apparatus according to claim 6, wherein the new text analytics application analyzer is executed by the at least one hardware processor to:
determine whether the expected performance loss for the new text analytics application is greater than a specified threshold; and
based on a determination that the expected performance loss for the new text analytics application is greater than the specified threshold, normalize the un-normalized data of the new text analytics application.

10. The apparatus according to claim 9, wherein the new text analytics application analyzer is executed by the at least one hardware processor to:
generate, for the new text analytics application and based on the normalized data of the new text analytics application, a normalized data new text analytics application machine learning model; and
determine the difference in performances with respect to an un-normalized data new text analytics application machine learning model and the normalized data new text analytics application machine learning model.

11. The apparatus according to claim 9, wherein the new text analytics application analyzer is executed by the at least one hardware processor to:
generate, for the new text analytics application and based on the normalized data of the new text analytics application, a normalized data new text analytics application machine learning model,
further comprising:
a new text analytics application generator, executed by the at least one hardware processor, to:
generate, based on the normalized data new text analytics application machine learning model, the new text analytics application.

12. A computer-implemented method for machine learning based quantification of performance impact of data irregularities, the method comprising:
generating, by at least one hardware processor, a knowledge base including a plurality of text analytics applications;
generating, by the at least one hardware processor and for each text analytics application of the plurality of text analytics applications, an irregularity feature vector;
generating, by the at least one hardware processor, for each text analytics application and based on minimization of irregularities present in un-normalized data associated with a corresponding text analytics application, normalized data associated with the corresponding text analytics application;

generating, by the at least one hardware processor, for each text analytics application and based on the un-normalized data associated with the corresponding text analytics application, an un-normalized data machine learning model;

generating, by the at least one hardware processor, for each text analytics application and based on the normalized data associated with the corresponding text analytics application, a normalized data machine learning model;

determining, by the at least one hardware processor, a difference in performances with respect to the un-normalized data machine learning model and the normalized data machine learning model;

determining, by the at least one hardware processor, semantic similarity for each pair of text analytics applications of the plurality of text analytics applications;

generating, by the at least one hardware processor and based on the determined semantic similarity, a plurality of clusters for the plurality of text analytics applications; and generating, by the at least one hardware processor, for each cluster of the plurality of clusters and based on the irregularity feature vectors and the determined difference in performances, a regression model.

13. The method according to claim 12, further comprising:

determining, by the at least one hardware processor, for a new text analytics application, semantic similarity with each cluster of the plurality of clusters;

identifying, by the at least one hardware processor, based on the determined semantic similarity with each cluster of the plurality of clusters, a cluster with a maximum semantic similarity; and generating, by the at least one hardware processor, for the new text analytics application, the irregularity feature vector.

14. The method according to claim 13, further comprising:

applying, by the at least one hardware processor and for the identified cluster with the maximum semantic similarity, an associated regression model on the irregularity feature vector for the new text analytics application; and determining, by the at least one hardware processor and based on the application of the associated regression model on the irregularity feature vector for the new text analytics application, an expected performance loss if irregularities in text data of the new text analytics application are not minimized.

15. The method according to claim 14, further comprising:

determining, by the at least one hardware processor, whether the expected performance loss for the new text analytics application is less than or equal to a specified threshold; and based on a determination that the expected performance loss for the new text analytics application is less than or equal to the specified threshold, generating, by the at least one hardware processor, a machine learning model for the new text analytics application from un-normalized data of the new text analytics application.

16. The method according to claim 14, further comprising:

determining, by the at least one hardware processor, whether the expected performance loss for the new text analytics application is greater than a specified threshold; and based on a determination that the expected performance loss for the new text analytics application is greater than the specified threshold, normalizing, by the at least one hardware processor, the un-normalized data of the new text analytics application.

17. The method according to claim 16, further comprising:

generating, by the at least one hardware processor, for the new text analytics application and based on the normalized data of the new text analytics application, a normalized data new text analytics application machine learning model; and determining, by the at least one hardware processor, the difference in performances with respect to an un-normalized data new text analytics application machine learning model and the normalized data new text analytics application machine learning model.

18. A non-transitory computer readable medium having stored thereon machine readable instructions, the machine readable instructions, when executed by at least one hardware processor, cause the at least one hardware processor to:

generate, for each text analytics application of a plurality of text analytics applications and based on minimization of irregularities present in un-normalized data associated with a corresponding text analytics application, normalized data associated with the corresponding text analytics application;

generate, for each text analytics application and based on the un-normalized data associated with the corresponding text analytics application, an un-normalized data machine learning model;

generate, for each text analytics application and based on the normalized data associated with the corresponding text analytics application, a normalized data machine learning model; and determine a difference in performances with respect to the un-normalized data machine learning model and the normalized data machine learning model.

19. The non-transitory computer readable medium according to claim 18, wherein the machine readable instructions, when executed by the at least one hardware processor, further cause the at least one hardware processor to:

generate, for each text analytics application of the plurality of text analytics applications, an irregularity feature vector;

determine semantic similarity for each pair of text analytics applications of the plurality of text analytics applications;

generate, based on the determined semantic similarity, a plurality of clusters for the plurality of text analytics applications; and generate, for each cluster of the plurality of clusters and based on the irregularity feature vectors and the determined difference in performances, a regression model.

20. The non-transitory computer readable medium according to claim 19, wherein the machine readable instructions, when executed by the at least one hardware processor, further cause the at least one hardware processor to:
  determine, for a new text analytics application, semantic similarity with each cluster of the plurality of clusters;
  identify, based on the determined semantic similarity with each cluster of the plurality of clusters, a cluster with a maximum semantic similarity; and
  generate, for the new text analytics application, the irregularity feature vector.

* * * * *